(12) United States Patent
Coudert et al.

(10) Patent No.: US 6,184,483 B1
(45) Date of Patent: Feb. 6, 2001

(54) PLUG-IN CIRCUIT BREAKER COMPRISING AN OPERATING LEVER FOR OPENING AND CLOSING OF POLES

(75) Inventors: Patrick Coudert, Varces; Alain Gerbert-Gaillard, Vourey; Michel Perroud, Grenoble, all of (FR)

(73) Assignee: Schneider Electric SA (FR)

( * ) Notice: Under 35 U.S.C. 154(b), the term of this patent shall be extended for 0 days.

(21) Appl. No.: 09/280,698

(22) Filed: Mar. 30, 1999

(30) Foreign Application Priority Data

Apr. 17, 1998 (FR) .................................................. 98 05120

(51) Int. Cl.[7] ...................................................... H01H 9/20
(52) U.S. Cl. .................................... 200/50.21; 200/50.24; 200/50.26; 200/323
(58) Field of Search .............................. 200/50.21–50.28, 200/318–327; 361/605–626

(56) References Cited

U.S. PATENT DOCUMENTS

| | | | | |
|---|---|---|---|---|
| 2,829,737 | * | 4/1958 | Favre | 200/564 |
| 3,084,238 | * | 4/1963 | Baskerville | 200/400 |
| 4,137,436 | * | 1/1979 | Barkan et al. | 200/50.25 X |
| 4,202,027 | * | 5/1980 | Ericson | 200/50.25 X |
| 4,703,137 | * | 10/1987 | Bohnen et al. | 200/50.25 |
| 4,713,508 | * | 12/1987 | Baginski et al. | 200/568 |
| 4,743,715 | * | 5/1988 | Gerbert-Galliard et al. | 200/50.26 |
| 5,309,217 | * | 5/1994 | Ishikawa | 200/50.21 X |

FOREIGN PATENT DOCUMENTS

| | | |
|---|---|---|
| 0 222 645 A1 | 5/1987 | (EP) . |
| 0 227 586 A1 | 7/1987 | (EP) . |

\* cited by examiner

*Primary Examiner*—J. R. Scott
(74) *Attorney, Agent, or Firm*—Parkhurst & Wendel, L.L.P.

(57) ABSTRACT

An extractable circuit breaker is equipped with an operating lever which can take at least three positions: an inoperative position, an opening control position in which operating lever operates in conjunction with an opening latch of the circuit breaker, and a closing control position in which it operates in conjunction with a closing latch of the circuit breaker. When the circuit breaker is in the plugged-in position, the operating lever is inoperative. When the circuit breaker leaves its plugged-in position, the operating lever operates in conjunction with a countergear lever supported by the fixed frame accommodating the circuit breaker and performs opening of the poles of the circuit breaker. When the circuit breaker passes beyond its plugged-out position in the extraction direction, the operating lever moves from its inoperative position to its opening control position and then to its closing control position, causing opening followed by closing of the poles. In the extracted position, the circuit breaker is thus open and unloaded.

11 Claims, 14 Drawing Sheets

PLUG-IN CIRCUIT BREAKER COMPRISING AN OPERATING LEVER FOR OPENING AND CLOSING OF POLES

BACKGROUND OF THE INVENTION

The invention relates to a switchgear apparatus comprising a fixed frame and a circuit breaker which can be inserted in or extracted from the fixed frame. It relates more precisely to the circuit breaker designed for such a switchgear apparatus.

A switchgear apparatus of this kind is described in the document EP-A-0,227,586. Its circuit breaker comprises a pair of contacts per pole, one of the contacts being movable and able to take with respect to the other a closed position corresponding to mechanical and electrical contact, and an open position. The circuit breaker is equipped with an opening device of the poles comprising a spring called the opening spring designed to move from a loaded state to a released state and from the released state to the loaded state, and a latch called the opening latch designed to latch the opening spring in its loaded state, the opening spring being associated to the movable contact in such a way that releasing of the opening spring drives the movable contact to an open position and that movement of the movable contact to its closed position results in loading of the opening spring. The circuit breaker is moreover equipped with a closing device provided with an energy storage device. A spring called the closing spring, constituting the energy storage device, is designed to move from a loaded state to a released state. A latch called the closing latch can latch the closing spring in its loaded state. The closing spring is associated to the movable contact in such a way that releasing of the closing spring drives the movable contact to its closed position.

The frame comprises main terminals connected to the electrical power circuit, for example via an external busbar, and designed to operate in conjunction with the terminals of the circuit breaker poles via plug-in contacts. It also comprises auxiliary connectors designed to operate in conjunction with corresponding connectors of the circuit breaker to close an electrical control circuit of the circuit breaker. The frame is box-shaped and comprises an opening on the front panel enabling the circuit breaker to be inserted, as well as slides for support and guiding of the circuit breaker in the frame. The frame is provided with a kinematic engagement system comprising a primary shaft designed to operate in conjunction with a removable crank-handle and an output element designed to operate in conjunction with the circuit breaker. The kinematic system is designed to take a plugged-in position corresponding to a plugged-in state of the circuit breaker in which the circuit breaker terminals are secured to the corresponding terminals of the frame, a plugged-out position corresponding to a plugged-out state of the circuit breaker in which the latter is not connected to the frame either by these main terminals or by its auxiliary connectors, and an intermediate test position corresponding to a test state of the circuit breaker in which the latter is connected to the frame by its auxiliary connectors, whereas its main terminals are disconnected. When the kinematic system is in the plugged-out position, the circuit breaker can be unsecured from the kinematic system to extract it completely from the frame.

The circuit breaker is equipped with an opening control designed to ensure that the poles are open when the kinematic system leaves its plugged-in position or approaches the latter position. This function is essential for safety of the device. Indeed, if the circuit breaker poles were closed when plug-in or plug-out takes place and a voltage was applied to the connection terminals of the frame, a destructive electrical arc would occur between the circuit breaker connection terminals and those of the frame. For reliability reasons, this control must be mechanical in order to ensure correct operation even in case of failure of the electrical control circuits of the circuit breaker. This function is therefore performed by a control comprising a movable element connected by a linkage system to the opening latch and able to take information relative to the presence of the removable crank-handle driving the kinematic engagement system. So long as the crank-handle is in the active position, the movable element remains in a position such that it forces the opening latch to remain in its unlatched position.

Furthermore the circuit breaker described in EP-A-0,227,586 is equipped with a device which guarantees that the circuit breaker opening latch and closing latch are placed in their unlatched position so long as the apparatus is extracted from its frame. This device complies with the usage which requires in certain countries that handling operations enabling the circuit breaker to be extracted from its frame give rise to automatic sequences so that the circuit breaker at the end of the extraction phase is open and that its energy storage device is unloaded, in order to avoid any risk of accident for the operator having to perform handling or disassembly of the circuit breaker. In practice, the circuit breaker is equipped with an operating device comprising a lever designed to take information from a cam securedly affixed to the fixed frame of the apparatus, and a transmission system to transmit the movement of the lever to the closing and opening latches. In a first position of the operating lever, the latches are free to take their latched or unlatched position. In a second position of the lever, the transmission system forces the two latches to take their unlatched position. Return springs bias the operating lever to its second position. When the circuit breaker is in the fixed frame, the lever operates in conjunction with a cam securedly affixed to the fixed frame, which forces it to take its first position: the latches can then take their unlatched or latched position depending on the orders transmitted by other control devices of the circuit breaker. When the circuit breaker is extracted from the fixed frame to a position beyond its plugged-out position, the operating lever is no longer in contact with the cam of the frame and takes its second position due to the biasing force of the return springs, moving the opening latch and closing latch to their unlatched position.

But the usage described above is not universal for it comprises several drawbacks. It can be noted for example that extraction of the circuit breaker according to the sequence described above may give rise to discharge of the closing spring whereas the opening latch is kept in the open position. In such a cycle, called discharge on open poles or no-load discharge, the energy of the closing spring is completely absorbed by end of travel stops which, in conventional opening and closing cycles, only have to absorb ten times less energy. This imposes either costly oversizing or a compromise on the endurance of the device. Certain users therefore do not want extraction of the circuit breaker to give rise to forced unloading of the device and limit their requirements to opening of the poles when plug-out takes place. We are therefore confronted with two markets with different requirements, one imposing that the closing spring be unloaded at the end of extraction and the other imposing that extraction does not have any influence on whether the closing spring is in the loaded or unloaded state.

The device described in EP-A-0,227,586 is not easily adaptable to all the markets for which a range of circuit breakers is intended. For fitting of the opening and unloading control to be possible at an advanced stage of manufacture of the circuit breaker, the control elements must be placed on one of the side faces of the circuit breaker, which imposes additional constraints and makes the device vulnerable to knocks, in particular when extraction and removal of the circuit breaker take place In addition, the device is complex since it imposes a superposition of two mechanical opening controls, one designed for opening when plug-in and plug-out operations are performed, i.e. between the plugged-in position and the test position, the other for opening when extraction and insertion are performed, between the plugged-out position and the extracted position.

SUMMARY OF THE INVENTION

One object of the invention is to reduce the structural differences between the circuit breaker intended for the market imposing that the closing spring be unloaded at the end of extraction and the market imposing that extraction does not have any influence on whether the closing spring is in the loaded or unloaded state. Another object is to reduce the assembly work required to perform differentiation between circuit breakers intended for the two markets and to enable this assembly to be performed at an advanced stage of manufacture of the circuit breaker. Another object is to make the circuit breaker more reliable by reducing the vulnerability of the operating mechanisms in particular when extraction and handling operations of the circuit breaker are performed.

According to the invention, these problems are solved with a circuit breaker comprising at least one pair of contact parts at least one of which is movable and can take with respect to the other a closed position corresponding to mechanical and electrical contact and an open position, an opening device comprising a latch called the opening latch designed to take a latched position in which it prevents movement of the movable contact part from its closed position to its open position and an unlatched position in which it enables this movement, a loading device comprising a spring called the closing spring designed, when relaxation thereof takes place, to move the movable contact part to its closed position, and a latch called the closing latch designed to latch the closing spring in its loaded state, comprising a movable control part accessible from the outside of the circuit breaker and designed to take an inoperative position in which it does not interact either with the opening latch or with the closing latch, a first opening control position and an unloading control position, the movable control part being designed to unlatch the opening latch by moving from its inoperative position to its first opening control position, and to unlatch the closing latch by moving from its first opening control position to its unloading control position. To comply with the requirements of the two markets described above, the movable control part thus simply has to be operated differently: if it is not required that the closing spring be unloaded when extraction is performed, the movable part is used only between its inoperative position and its first opening control position for opening the poles when a plug-out operation is performed; if on the other hand the user requires discharge of the energy storage spring when extraction is performed, the movable part is used both for opening when plug-out is performed and for discharging the spring when extraction is performed beyond the plug-out position. Differentiation between the two operating modes is obtained essentially by the shape of the cams fixed to the apparatus frame and designed to operate in conjunction with the movable part. The number of parts which must be accessible from outside the circuit breaker is thus reduced to a minimum, since modification of the operating mode to comply with the requirements of one or the other of the markets does not require modification of numerous moving parts of the circuit breaker. The work required to adapt to the requirements is therefore made easier and vulnerability to knocks is reduced.

Preferably, the circuit breaker comprises a return spring to return the movable control part to its inoperative position and a movable latching part designed to take a latching position in which it latches the movable control part in a position other than the inoperative position and a released position in which it does not interact with the movable control part. The fact that the movable part is returned to its inoperative position makes opening control particularly simple when plug-out is performed. The latching part makes it possible to keep the extracted circuit breaker in its unloaded open state. This device also enables a skilled operator who wishes to perform closing and opening sequences on the extracted circuit breaker for a particular maintenance operation to operate the latching part to release the movable control part. The device obtained is simple and its use is intuitive.

Preferably, the movable control part is a lever. It can nevertheless also be envisaged to use other types of movable elements, such as rod linkage systems or pull-rods guided in translation.

Particularly easy operation is achieved when the movable control part, when moving from its first opening control position to its unloading control position, secures the opening latch in the unlatched position. In this case, movement of the movable part from its first opening control position to its unloading control position causes a no-load discharge of the energy storage spring, i.e. a relaxation of the energy storage spring which does not cause closing of the poles.

Alternatively, the movable control part is able to take a second opening control position, the unloading control position being situated between the first opening control position and the second opening control position, and the movable control part, when moving to its unloading control position, does not interact with the opening latch. This operating mode enables an unloaded open state to be reached without causing a no-load discharge, which proves advantageous for the endurance and reliability of the device.

When the circuit breaker is designed for a use wherein the unloading control position of the movable control part is not used, access to this position is preferably inhibited by a blocking means, for example a stop coming into contact with the movable control part before the latter reaches the unloading control position. The structural differentiation between circuit breakers intended for one market or the other is therefore reduced to the presence or absence of a stop.

The invention also relates to a switchgear apparatus comprising a circuit breaker as previously defined and a fixed external frame equipped with a kinematic engagement system comprising at least one primary shaft guided in rotation with respect to the frame and designed to operate in conjunction with a drive part, and an output part designed to operate in conjunction with the circuit breaker in such a way that rotation of the primary shaft causes movement of the kinematic transmission system between a plugged-out position and a plugged-in position and the corresponding movement of the circuit breaker in reversible manner from a plugged-out state to a plugged-in state, whose frame or kinematic engagement system comprises in addition at least one link part for connection to the movable control part, designed to operate directly or indirectly in conjunction with the movable control part so as to move the latter to its first opening control position when the circuit breaker or kinematic transmission system passes via a first indexed position, in the plug-out direction. The frame or kinematic engagement system preferably comprises in addition at least one link part for connection to the movable control part, designed to operate directly or indirectly in conjunction with the movable control part so as to move the latter to its unloading control position when the circuit breaker passes via a second indexed position with respect to the frame, in the plug-out direction. The positions indexed by the link part may be a more or less small distance apart, or even be practically identical.

To perform the opening function of the poles when plug-out takes place, it is desirable for the frame or kinematic engagement system to comprise in addition at least one link part for connection to the movable control part designed to operate directly or indirectly in conjunction with the movable control part when the circuit breaker is in its plugged-in position or near to this position, in such a way that the movable control part moves from its inoperative position to its first opening control position when the circuit breaker leaves the plugged-in position. Preferably the output part of the kinematic transmission system comprises at least one engagement cam designed to operate in conjunction with a follower element of the circuit breaker in such a way that rotation of the engagement cam in one direction causes plug-in of the circuit breaker and that rotation of the engagement cam in the opposite direction causes plug-out of the circuit breaker, the zone of the engagement cam corresponding to the circuit breaker reaching its plugged-in position being shaped in such a way that a large rotation of the engagement cam corresponds to a small or nil movement of the circuit breaker with respect to the frame. This arrangement makes detection of initiation of the plug-out movement easy to achieve, enabling opening to be commanded before a significant movement of the circuit breaker has taken place.

BRIEF DESCRIPTION OF THE DRAWINGS

Other advantages and features of the invention will become more clearly apparent from the following description of different embodiments of the invention, given as non-restrictive examples only and represented in the accompanying drawings in which.

DETAILED DESCRIPTION OF THE PREFERRED EMBODIMENT

Figure 1:
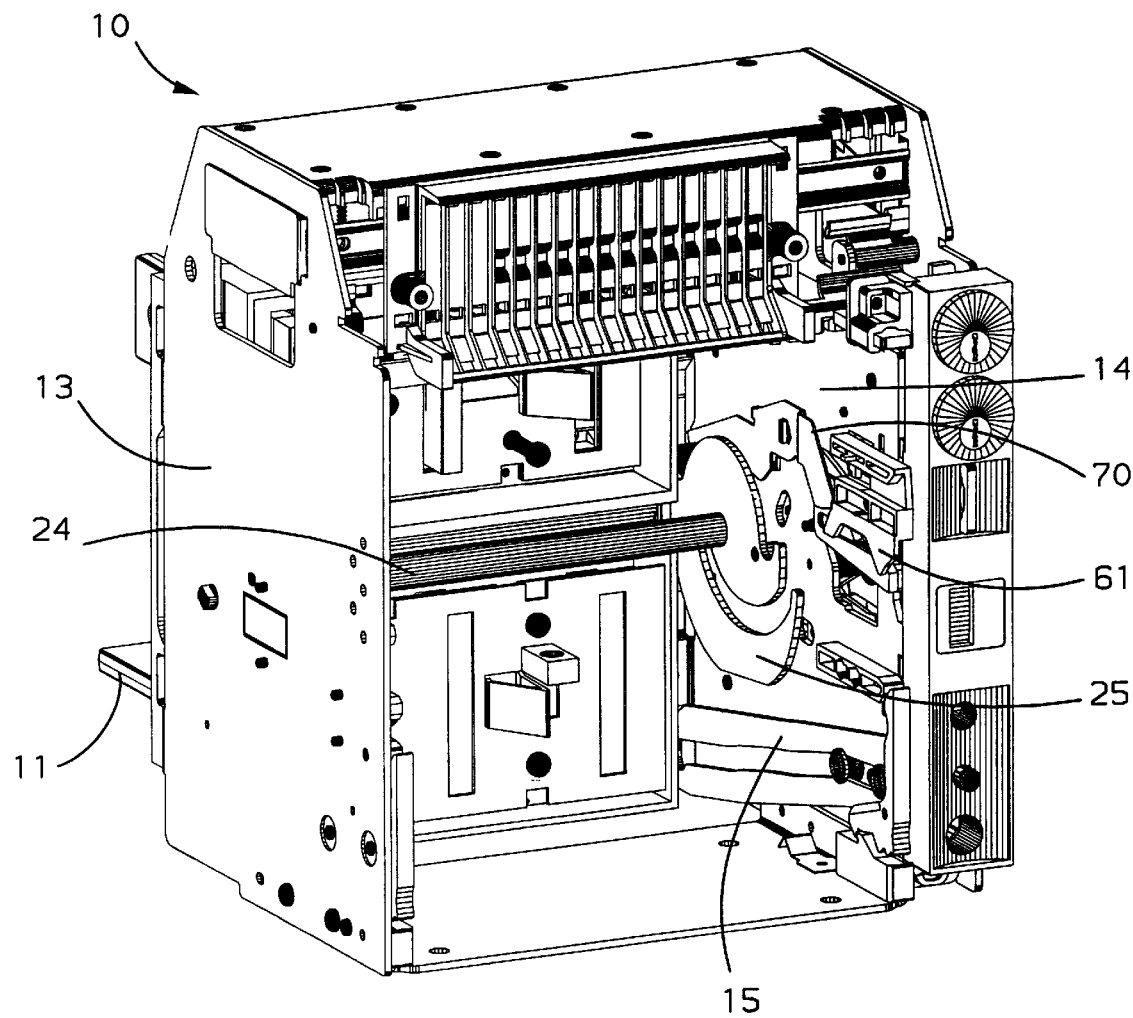
FIG. 1 is a perspective view of a fixed frame of a switchgear apparatus according to the invention.
Figure 2:
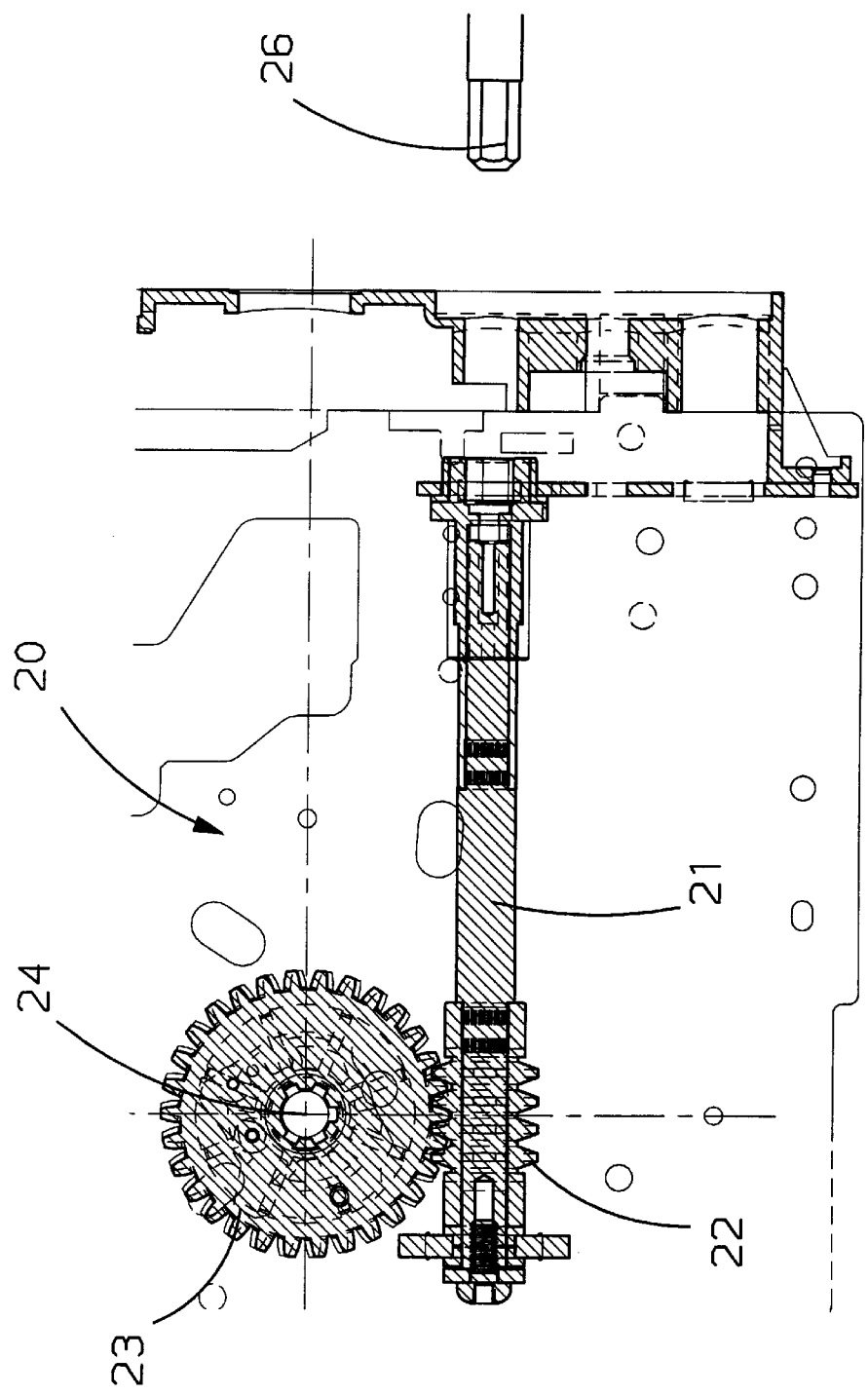
FIG. 2 is a view of a kinematic transmission system fitted in the fixed frame.

The fixed external frame 10 of a switchgear apparatus according to the invention has been represented in FIG. 1. This frame enables a plug-in circuit breaker according to the invention to be accommodated. It comprises in conventional manner on the rear panel connection strips 11 for electrical connection to a busbar of the electrical power distribution system. On the side walls 13 and 14 of the frame there are arranged slides 15 designed to support and guide the circuit breaker in its translation movement between its extracted position and its plugged-in position. The frame also supports in its right side part a plug-in mechanism represented in FIG. 2, comprising a kinematic transmission system 20 whose input drive part is a longitudinal primary shaft 21 guided in rotation and fixed in translation with respect to the frame 10 and whose output driven part is a transverse engagement shaft 24 bearing an engagement cam 25 near to each side wall 13, 14 of the frame. The free end of the primary shaft 21 is designed to operate in conjunction with an operating crank 26. The drive shaft 21 and driven shaft 24 are linked to one another by a countergear transmission with a cogwheel 23 and endless screw 22. Rotation of the drive shaft 21 results in conventional manner in rotation of the cams 25 which each drive a roller of the circuit breaker in reversible manner between the plugged-out position and the plugged-in position.

Figure 3:
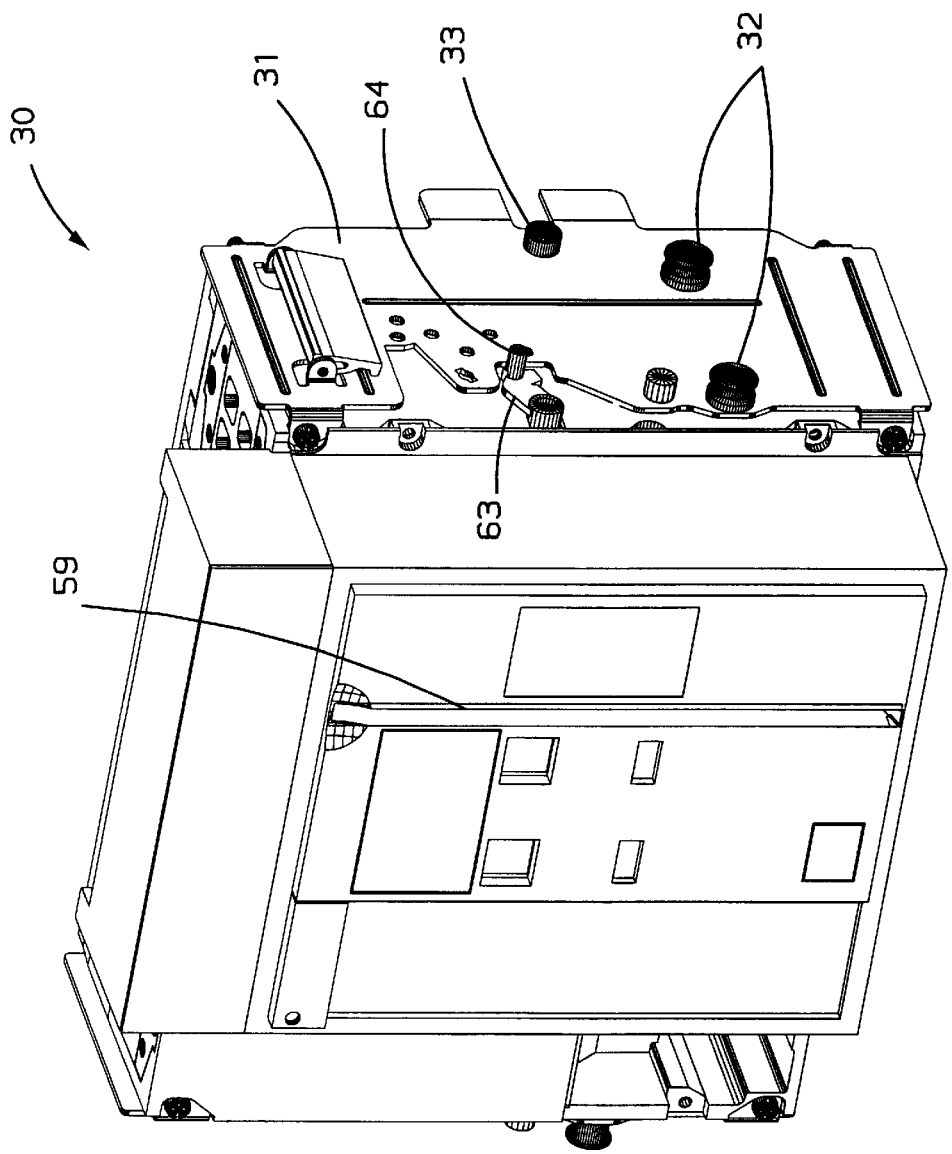
FIG. 3 is a perspective view of a circuit breaker according to the invention.

The circuit breaker 30 withdrawn from its external frame 10 is represented in FIG. 3. A side flange 31 is added to the circuit breaker and supports rollers 32 designed to operate in conjunction with the slides 15 of the frame and a roller 33 designed to operate in conjunction with one of the engagement cams 25.

Figure 4:
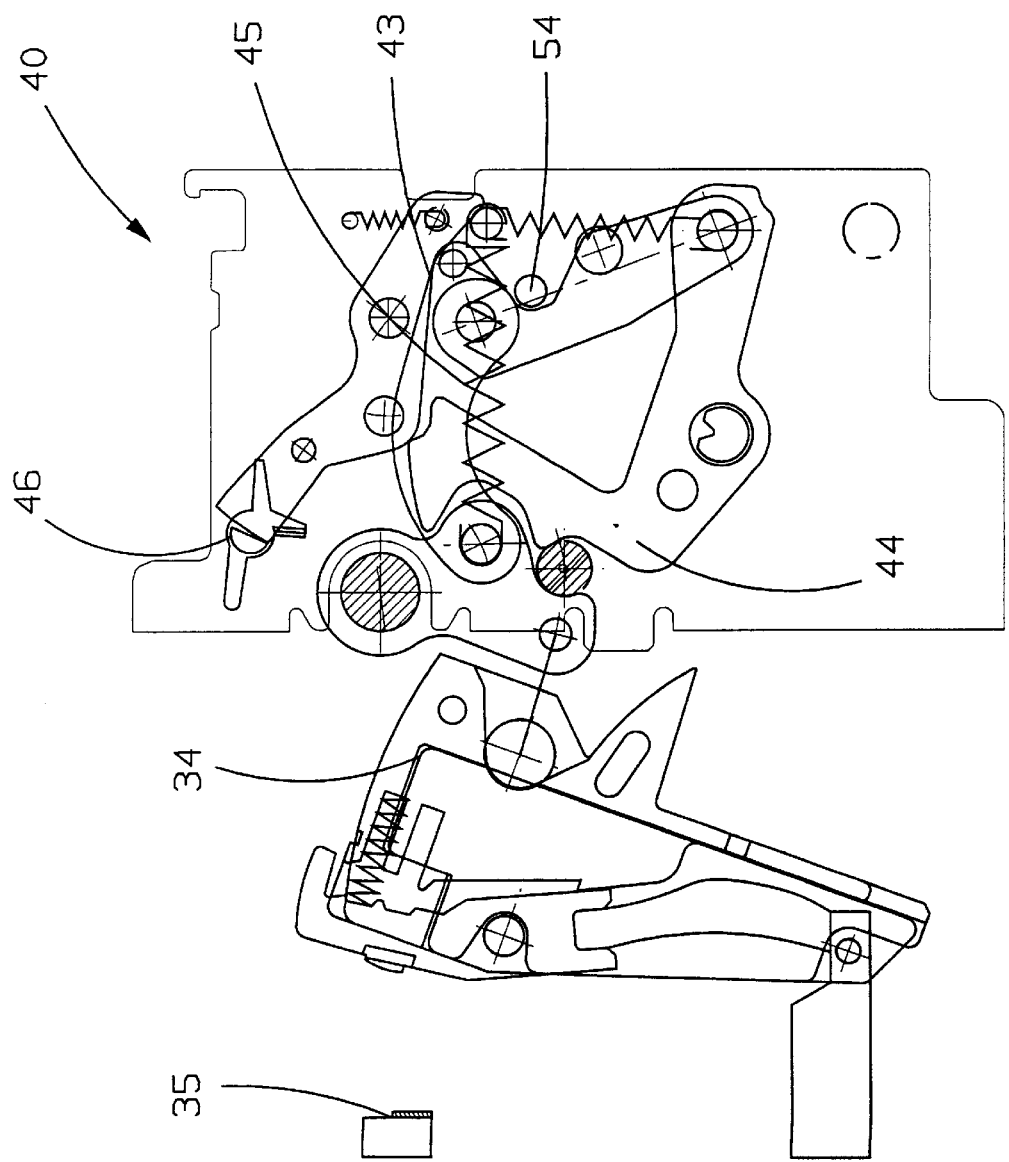
FIG. 4 is an outline diagram of an opening device of the circuit breaker poles, in the open position.
Figure 5:
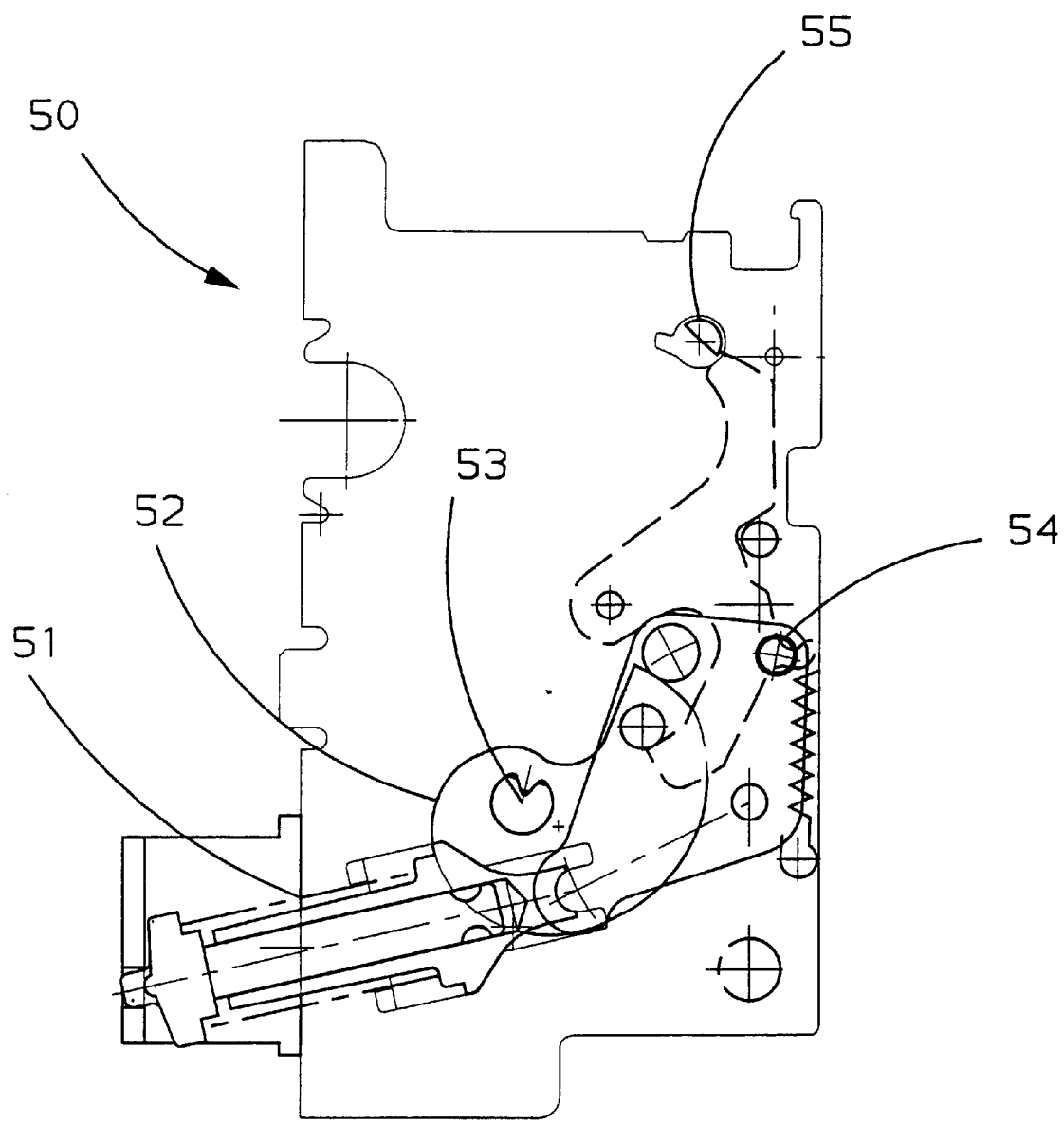
FIG. 5 is an outline diagram of a circuit breaker loading device with energy storage, in the loaded position.

With reference to FIGS. 4 and 5, the circuit breaker 30 comprises, in a manner known in itself, a pair of separable contact parts 34, 35 per pole and an operating mechanism commanding opening and closing of the poles, equipped with an energy storage device. This mechanism comprises an opening device 40, which can be seen in FIG. 4, with a toggle 43 associated to a trip hook 44 and to an opening spring 45 to move the movable contact 34 to the open position, loading of the opening spring 45 being performed automatically when closing of the poles takes place. It comprises in addition an energy storage loading device 50 which can be seen in FIG. 5 comprising at least one closing spring 51 to move the movable contact to its closed position, loading of the closing spring 51 being performed by a reloading cam 52 keyed onto a shaft 53.

Figure 6:
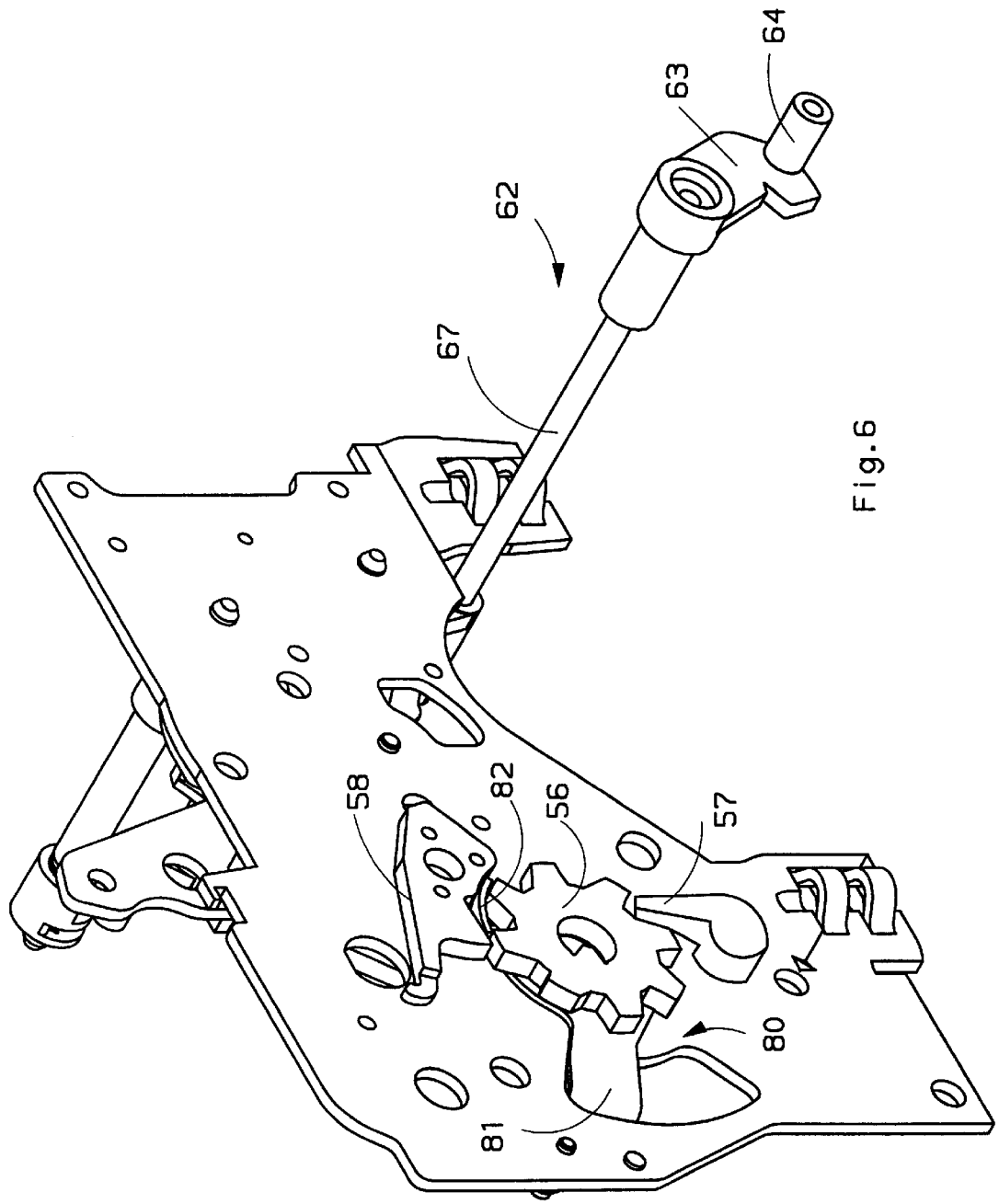
FIG. 6 is a perspective view of a part of the circuit breaker loading device.
Figure 7:
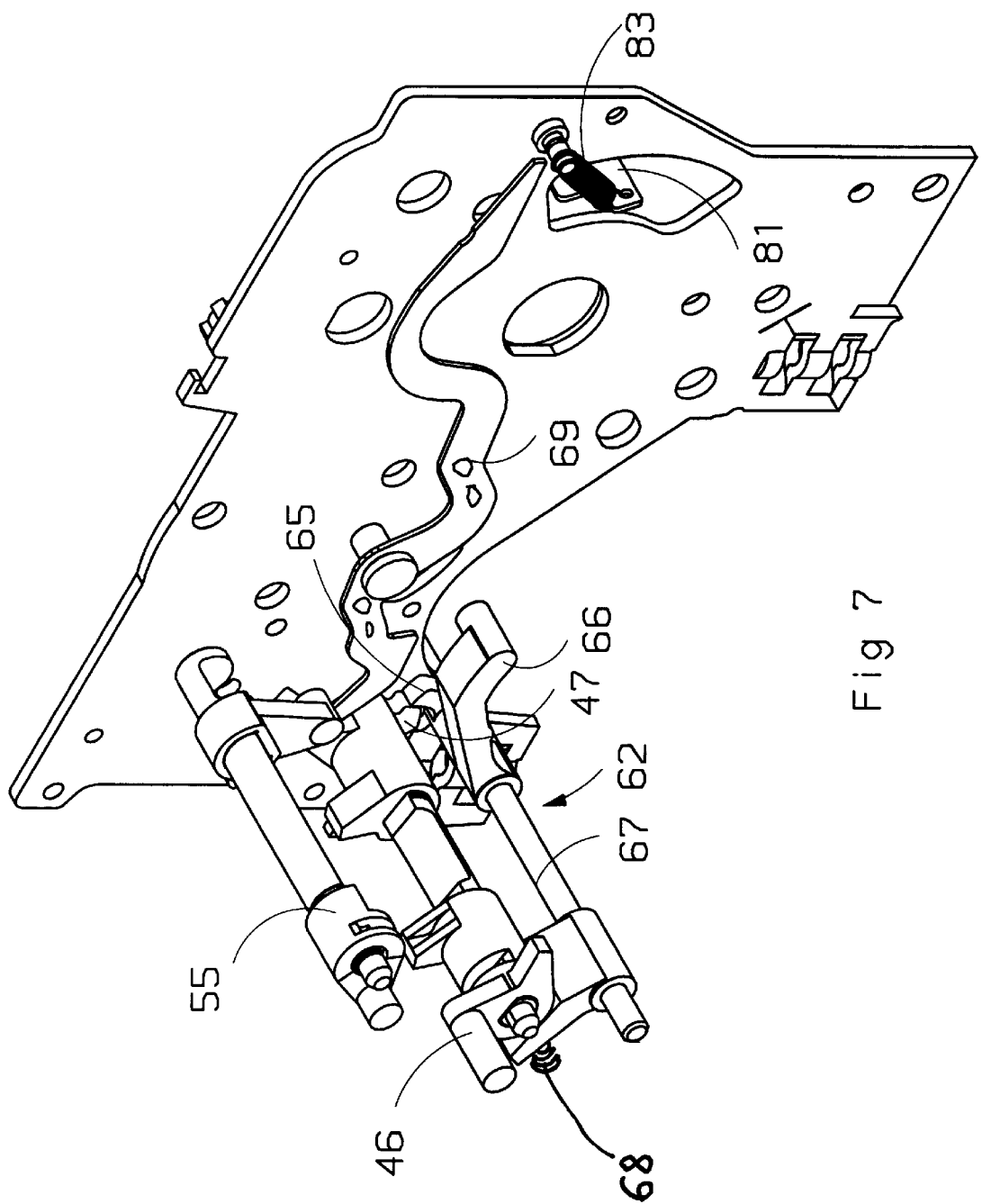
FIG. 7 is a perspective view showing operation of an operating lever according to the invention in conjunction with the circuit breaker opening and loading devices.

A rack wheel 56, which can be seen in FIG. 6, is keyed onto the shaft 53 and operates in conjunction with an anti-return catch 57 and a drive catch 58. The two catches are equipped with return springs, not represented, tending to bias them to a position in which they operate in conjunction with the rack wheel 56. The spindle of the anti-return catch 57 is supported by a support flange of the circuit breaker. This catch 57 prevents rotation of the rack wheel 56 in the clockwise direction in the figure. The rack wheel 56 and catch 57 therefore form together a free-wheel coupling between the shaft 53 and the support flange securely affixed to the circuit breaker. An oscillating handle 59 (FIG. 3), which constitutes the drive part of the loading device, is pivotally mounted around an imaginary axis geometrically identical to that of the shaft 53. The spindle of the drive catch 58 is securely united to a dish, not 10 represented, itself securely united to the handle 59. The catch 58 operates in conjunction with the rack wheel 56 so as to oppose the rotary movement of the rack wheel 56 with respect to the catch 58 and the oscillating handle 59 in the clockwise direction in FIG. 6. The rack wheel 56 therefore forms with the drive catch 58 a free-wheel clutch between the drive part formed by the handle 59 on the one hand and the shaft 53 constituting a driven part on the other hand. Counterclockwise pivoting of the handle results in rotation of the spindle of the drive catch 58 around the axis of the shaft 53 which drives the rack wheel 56 and shaft 53 in the counterclockwise direction.

A closing latch 55 (FIG. 5) enables the cam 52 to be latched in the loaded position, and then unlatched, thus enabling high-speed relaxation of the closing spring 51. The energy storage loading device 50 is linked to the opening mechanism 40 by a finger 54 acting on the toggle 43 in such a way that relaxation of the closing spring 51 drives the opening device 40 to its open position. Such a device and its operation are described in detail in the document EP-A-0, 222,645, the description whereof is on these points incorporated herein by reference. The opening latch 46 and closing latch 55 are biased by return springs to their latching position.

Figure 9:
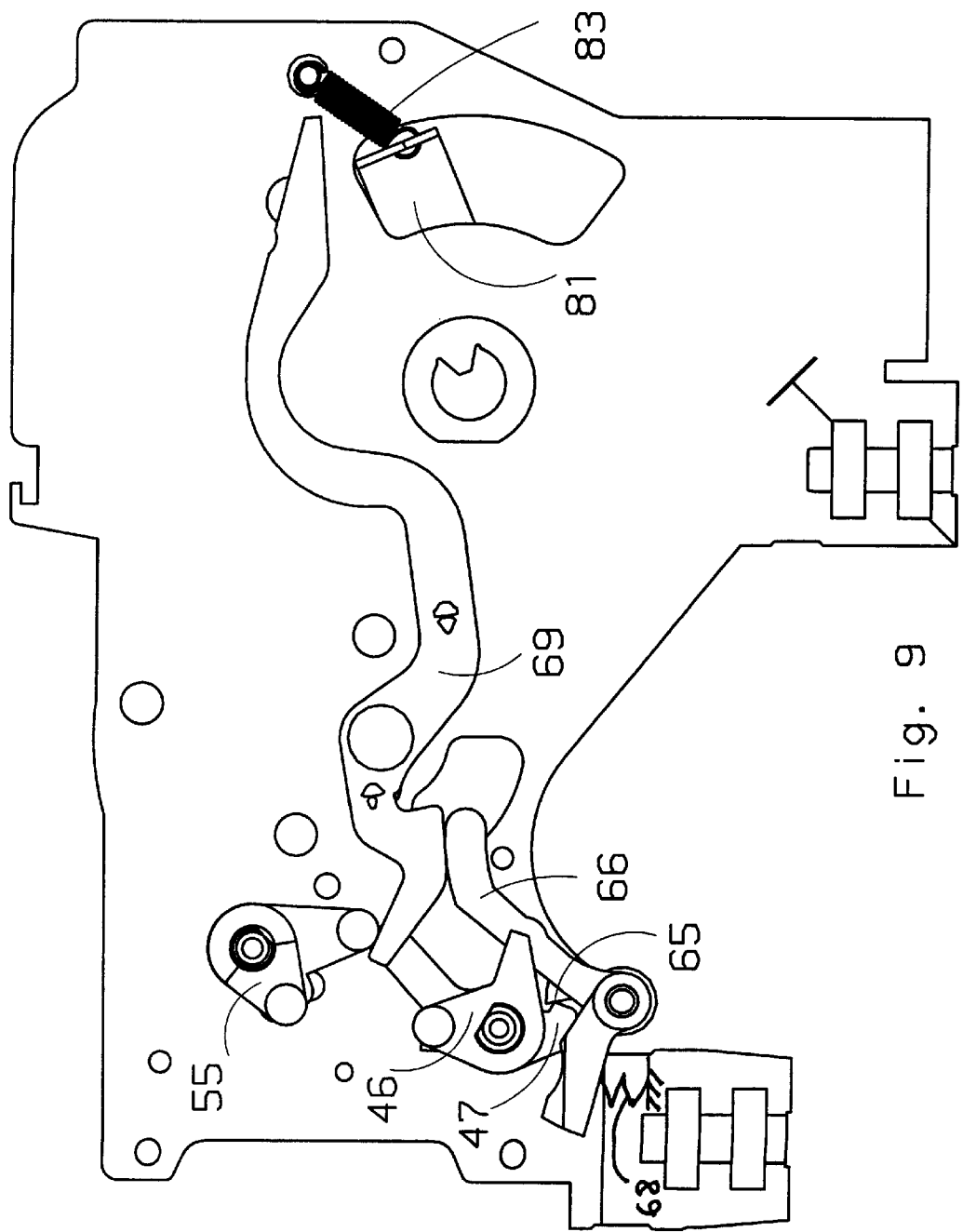
FIG. 9 shows the operating lever in an opening control position.
Figure 10:
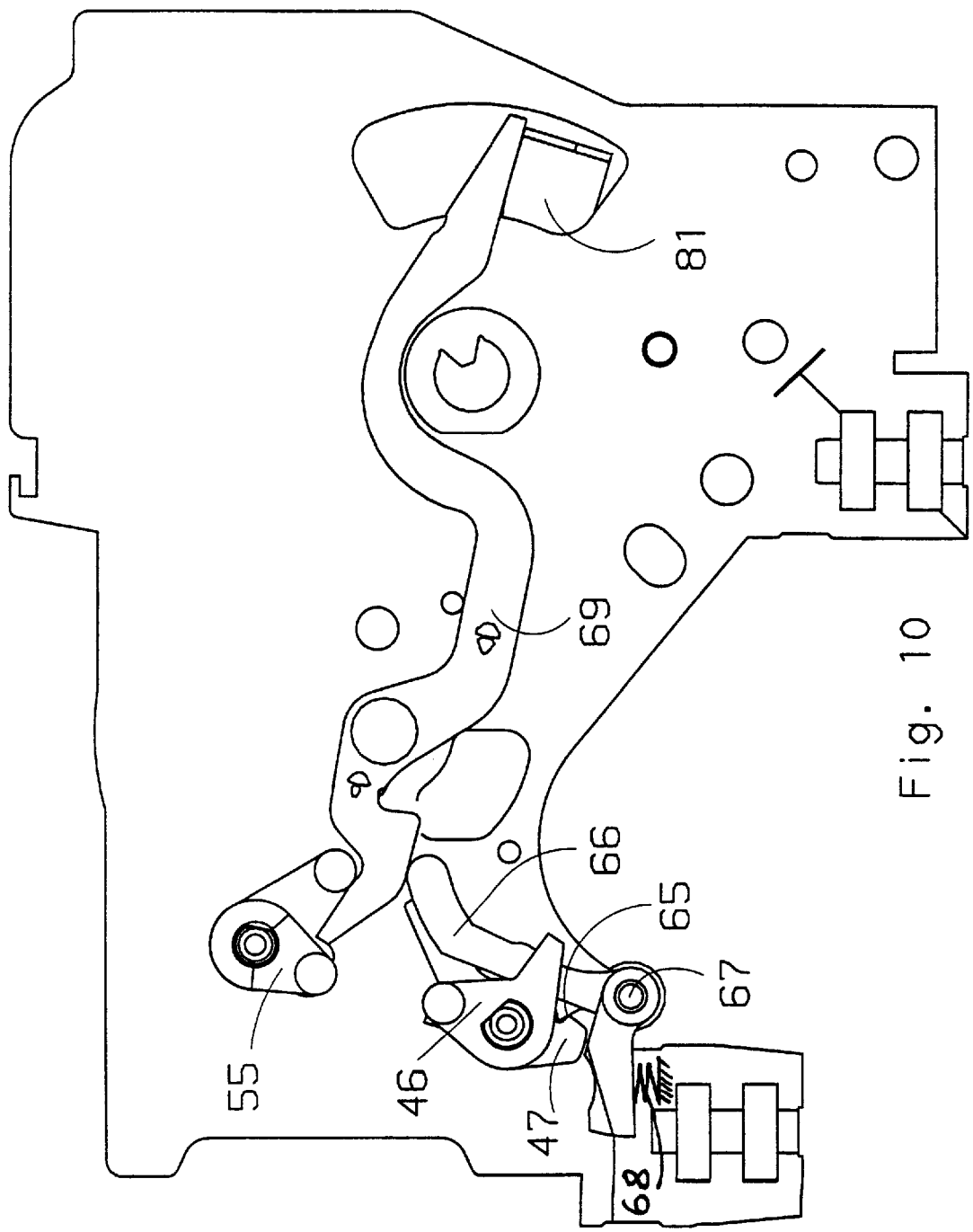
FIG. 10 shows the operating lever in a closing control position.

A drive arm 63 of an operating lever 62 of a pre-tripping control 60 can be seen in FIGS. 3 and 6, this drive arm 63 comprising a finger 64 designed to operate in conjunction with a cam 61 securely affixed to the side wall 14 of the frame 10 (cf. FIG. 1) when the circuit breaker is moved between the plugged-out position and the extracted position. The operating lever 62 in addition comprises a first driven arm 65, a second driven arm 66, which can be seen in FIGS. 7 to 10, and a shaft 67 securing the three arms 63, 65 and 66. The operating lever 62 is able to take an inoperative position, an opening control position and a closing control position, represented respectively in FIGS. 8, 9 and 10. It is biased to its inoperative position in the clockwise direction in the figures by a return spring 68 working in compression with respect to a flange of the circuit breaker.

The first driven arm 65 of the lever 62 is designed to operate in conjunction with a spigot 47 of the opening latch 46. The second driven arm 66 is designed to operate in conjunction with an intermediate lever 69 with three bearing surfaces. The intermediate lever 69 is designed to operate in conjunction with the closing latch 55 and with a catch cache lever 81 of a trip mechanism 80 which is the subject of a patent application filed on the same day as the present application, the content whereof is on this point incorporated herein by reference. The trip mechanism 80, which can be seen in FIG. 6, performs a disengagement function between the oscillating reloading handle 59 and the resetting cam 52 of the loading device 50. The catch cache lever 81 pivots around the rotation axis common to the shaft 53 and oscillating handle 59 between a rest position and an active position. It comprises a plate 82 which, in the active position, places itself between the rack wheel 56 and the drive catch 58. The catch cache lever is biased by a return spring 83 to its rest position.

Figure 11:
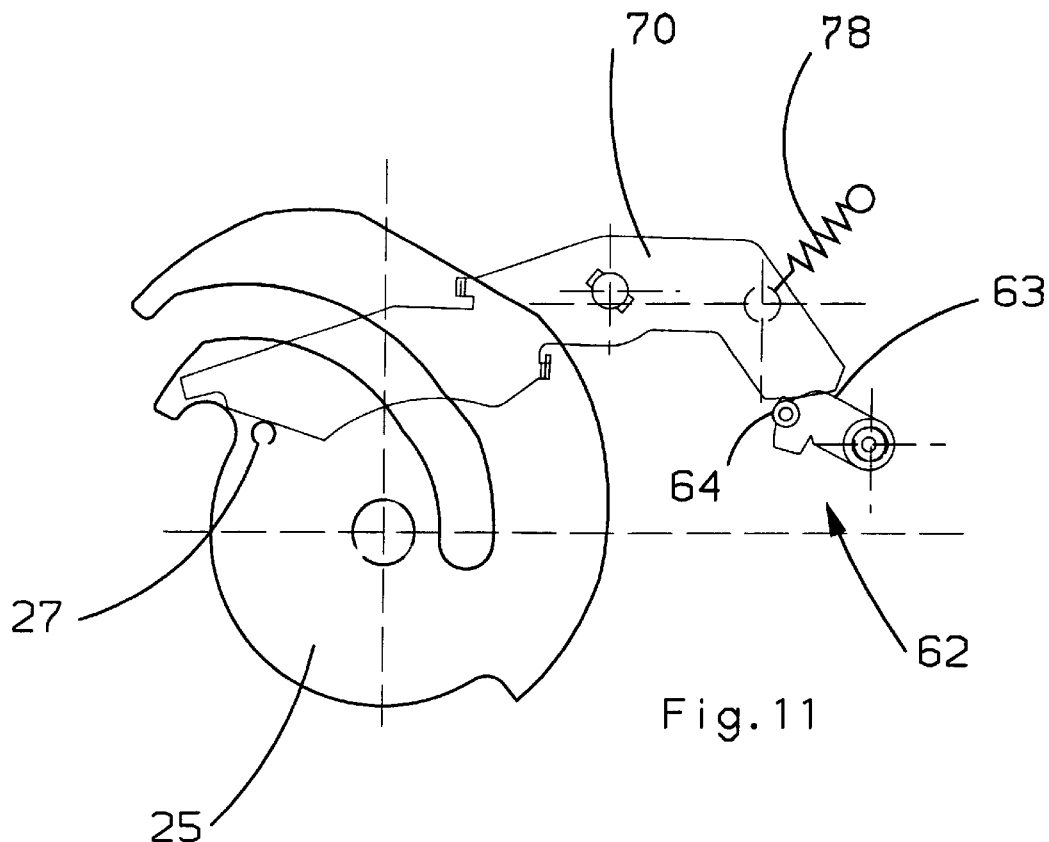
FIG. 11 shows a countergear lever arranged between the operating lever and an engagement cam of the frame in a plugged-in position.
Figure 12:
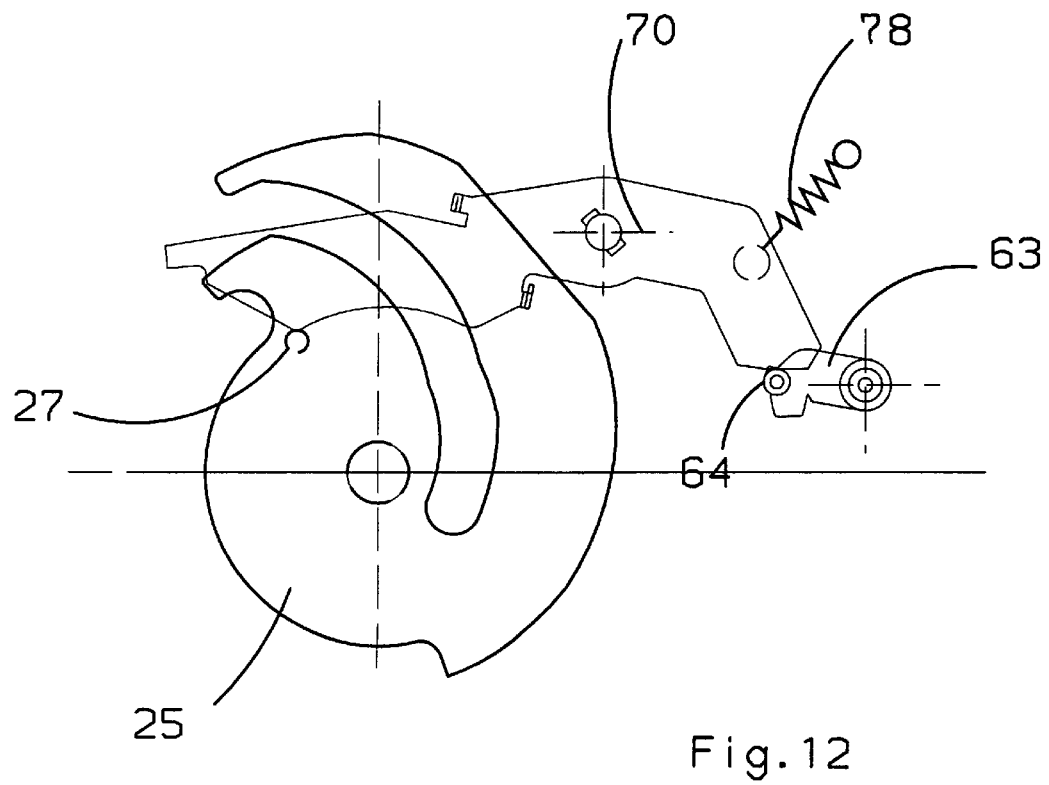
FIG. 12 shows the countergear lever acting on the operating lever when plugout takes place.

Furthermore, a countergear lever 70, which can be seen in FIGS. 1, 11 and 12, is pivotally mounted on the wall 14 of the frame 10 and cooperates via the end of one of its arms forming a ramp with an eccentric finger 27 securely united to the engagement cam 25. The other arm of the countergear lever 70 also forms a ramp designed to cooperate with the finger 64 of the operating lever 62 in the plugged-in position of the circuit breaker. The lever is biased to the position wherein it is in contact with the finger 27 by a spring 78.

Figure 13:
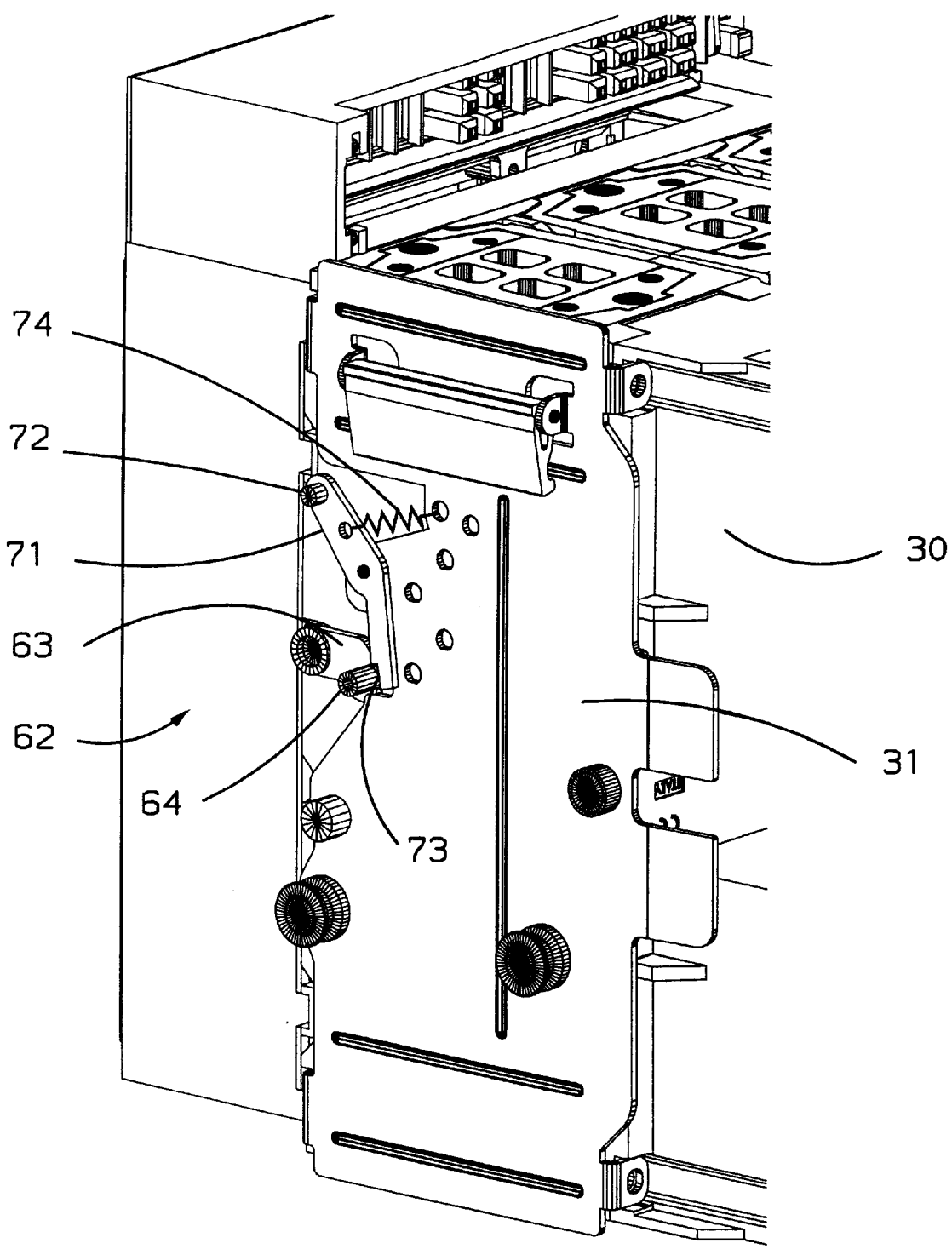
FIG. 13 is a perspective view of a securing latch of the operating lever.

A securing latch 71, represented in FIG. 13, is pivotally mounted on the circuit breaker 30. One of the arms of this latch 71 comprises a finger 72 designed to operate in conjunction with a ramp of the cam 61 securely affixed to the frame 10 whereas the other arm comprises a notch 73 designed to operate in conjunction with the finger 64 of the operating lever 62 when the latter is in its closing control position. The latch 71 is biased towards the lever 62 by a spring 74.

The action of the operating lever on the opening and closing latches is as follows. In the inoperative position (FIG. 8), the operating lever 62 does not interfere either with the opening latch 46 or with the intermediate lever 69. When moving to its opening control position by pivoting in the counterclockwise direction in FIG. 9, the operating lever 62 cooperates via its first driven arm 65 with the opening latch 46 and drives the latter to its unlatched position. Consequently, the circuit breaker poles are necessarily open at the end of this process. When moving to its closing control position in the counterclockwise direction in FIG. 10, the operating lever 62 cooperates via its second driven arm 66 with the intermediate lever 69 and makes the latter pivot in the clockwise direction in the figure. The intermediate lever 69 thus almost simultaneously on the one hand drives the closing latch 55 to its unlatched position and on the other hand drives the catch cache 81 to a position such that the plate 82 of the catch cache 81 is interposed between the drive catch 58 and the rack wheel 56 and thus disconnects the shaft 53 completely from the handle 59. At the same time, the opening latch 46 covers a dead travel beyond its unlatched position. If the closing spring 51 was initially loaded, this process gives rise to discharging of the spring 51. This discharge is a no-load discharge since the opening latch 46 continues to cooperate with the operating lever 62 and cannot return to its latching position.

The action of the operating lever 62 in its different positions having been described, operation of the device when extraction of the circuit breaker takes place is as follows. In the plugged-in position, the engagement cam 25 is in the configuration represented in FIG. 11. The countergear lever 70 is in contact with the finger 27 of the cam 25 and with the finger 64 of the operating lever 62 which is in its inoperative position. When the plug-out phase begins, the engagement cam 25 pivots in the clockwise direction and takes the position represented in FIG. 12. The cam 25 is shaped in such a way that this rotation induces a nil or very small movement of the circuit breaker roller 33. The plug-in contact grips consequently achieve the mechanical and electrical connection between the circuit breaker terminals and those of the frame are subjected to practically no effort in this phase.

Due to the rotation of the engagement cam 25, the finger 27 drives the countergear lever 70 clockwise, which makes the operating lever pivot in the counterclockwise direction to its opening control position. Unlatching of the opening latch therefore takes place: the circuit breaker is therefore open, whatever its previous state may have been. Due to the continued rotation of the engagement cam, this cam operates in conjunction with the roller 33 via a zone configured in such a way that for a given angle of rotation of the plug-in cam, the movement of the roller and of the circuit breaker is large. The circuit breaker 30 is therefore progressively extracted to the test position. The operating lever 62, which is securedly affixed to the circuit breaker 30, moves with the latter and is released from the countergear lever 70. It then reverts to its inoperative position due to the biasing force of its return spring 68.

When the extraction sequence takes place starting from the test position, the operating lever 62 comes into contact with a first ramp of the cam 61, which moves it to its opening control position against the biasing force of its return spring 68. On completion of this first sequence, the circuit breaker is open, whatever its previous state. When the extraction movement is continued, the operating lever 62 encounters a second ramp of the cam which drives it to its closing control position. No-load closing of the circuit breaker then takes place and the plate 82 of the catch cache 81 is interposed between the drive catch 58 and the rack wheel 56 of the loading device 50. In this position, the finger 64 of the operating lever 62 encounters the notch 73 of the securing latch 71 which holds it in the closing control position. It is then impossible to reload the device, since the opening control latch 46 and closing control latch 55 are both kept open and the handle 59 is disengaged.

In reverse manner, when the circuit breaker 30 is inserted in the frame 10, the finger 72 of the securing latch 71 operates in conjunction with a ramp of the cam 61 which makes it pivot against the biasing force of its return spring 74 in a direction moving the notch 73 away from the operating lever 62 and releasing the latter.

As described above, the device is directly usable for the market requiring that the extracted switchgear apparatus be open and unloaded. To obtain operation without unloading when plug-out is performed, a removable stop simply has to be fitted fixed onto the side flange of the circuit breaker and preventing the operating lever from reaching its closing control position. In practice, an opposite approach can also be adopted: the side flange of the circuit breaker on leaving the manufacturing plant comprises an edge which cooperates with the operating lever in its opening control position and prevents it from reaching its closing control position. The circuit breaker as such is therefore intended for the market without unloading when plug-out is performed. If the circuit breaker is to be adapted to the market requiring discharge when plug-out takes place, this edge simply has to be broken to arrange a sufficient opening in the flange for the control lever to move to its second position. The transformation is then irreversible, but it avoids having to manage an additional part.

Figure 14:
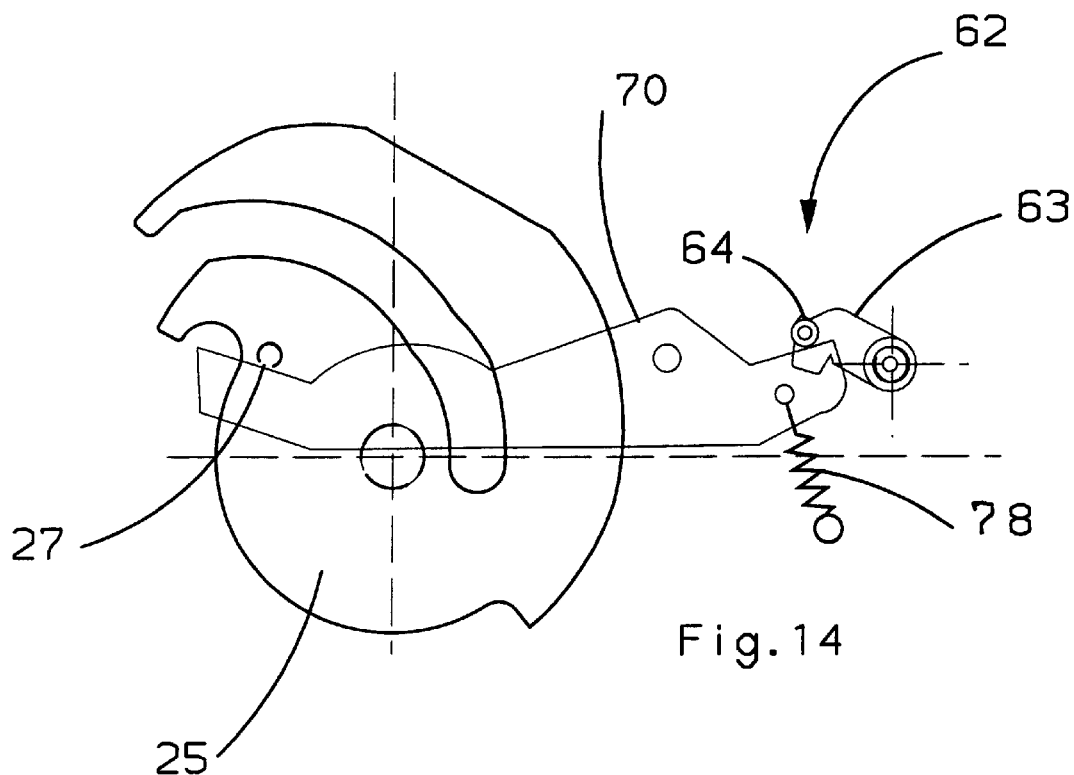
FIG. 14 is a view of a countergear lever designed to operate in conjunction with an operating lever according to a second embodiment of the invention, in a plugged-in state of the switchgear apparatus.
Figure 15:
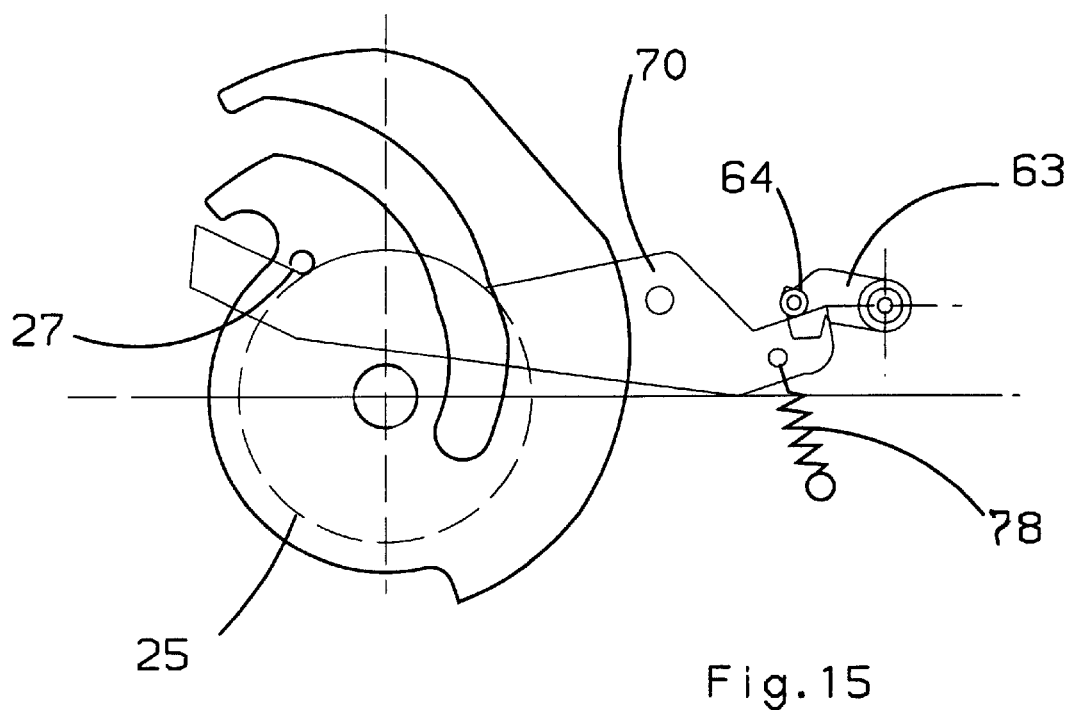
FIG. 15 is a view of the countergear lever operating in conjunction with the operating lever according to the second embodiment of the invention, when the circuit breaker leaves its plugged-in position.

According to a second embodiment of the invention, the operating lever is biased by a return spring to its closing control position and not to its inoperative position. This enables the securing latch to be eliminated as it no longer serves any purpose. Operation of the device between the plugged-in position and the test position is represented in FIGS. 14 and 15. The countergear lever 70 is biased clockwise by the operating lever 62 and counterclockwise by the finger 27 of the engagement cam 25. In the plugged-in position (FIG. 14), the finger 27 imposes its position on the countergear lever 70 which blocks the operating lever 62 in its inoperative position. As soon as rotation of the engagement cam begins (FIG. 15), the finger 27 releases the countergear lever 70 which pivots clockwise due to the force of the operating lever 62 until it comes up against an end of travel stop. The operating lever 62 takes its opening control position due to the biasing of its own return spring. When rotation of the engagement cam is pursued, the circuit breaker continues its movement and departs from contact with the countergear lever to cooperate with the cam 61 which in a first stage moves it to the inoperative position. Operation of the device between the plugged-out position and the extracted position of the circuit breaker is identical to operation of the first embodiment. Only the shape of the cam 61 has to be adapted to generate the suitable movements of the operating lever 62. In practice, the cam has to comprise a first surface forcing the lever to its inoperative position when the circuit breaker is in its test position, a second surface enabling the operating lever 62 to pivot to its first opening control position. On leaving this second surface, the operating lever takes its closing control position of its own accord due to the biasing force of its return spring and tends to keep this position so that, as stated above, the securing lever is no longer required. In the reverse manner, when plug-in takes place, suitable ramps of the cam 61 enable the operating lever to successively revert to its first opening control position and its inoperative position.

Figure 8:
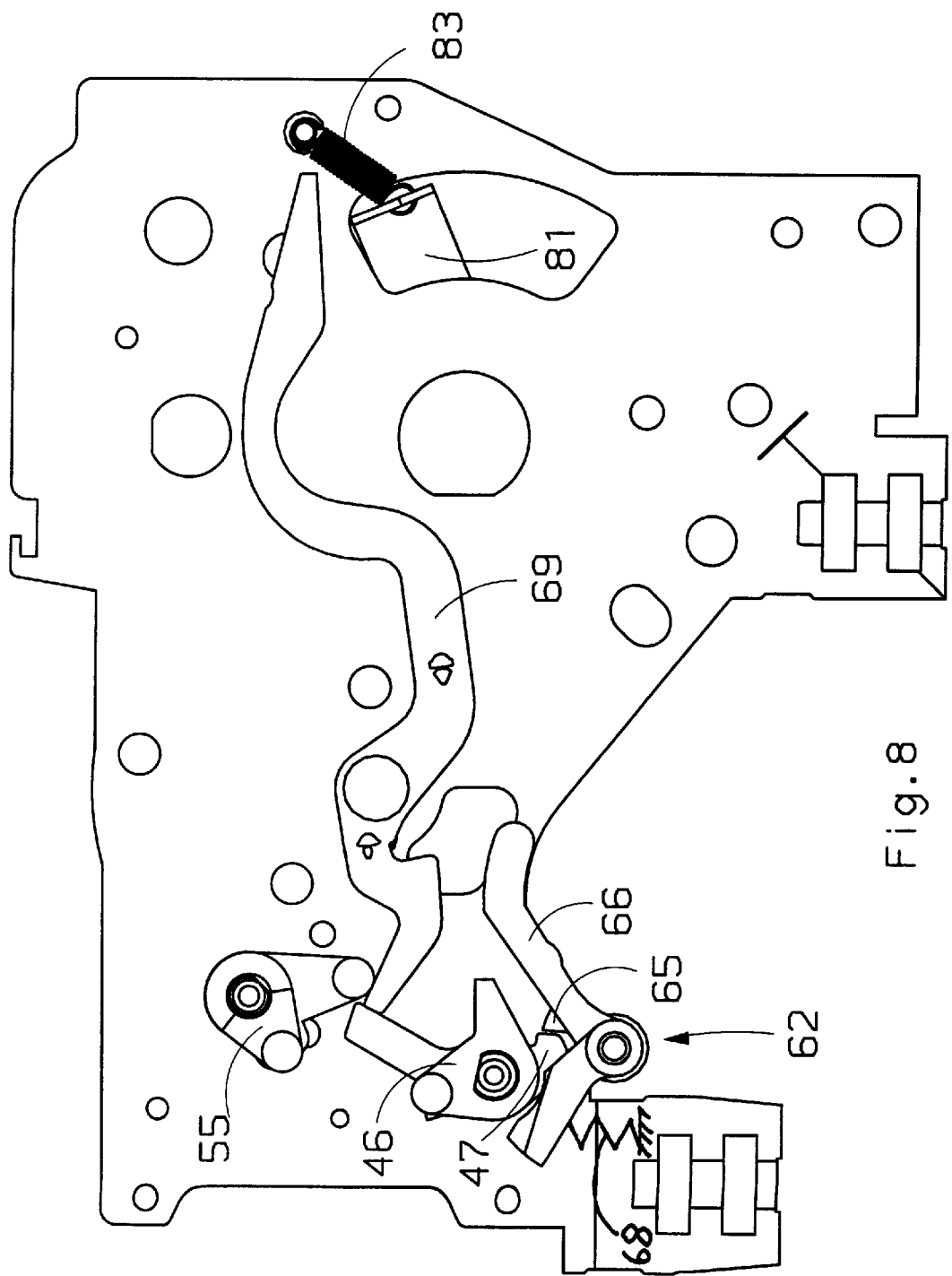
FIG. 8 shows more precisely the operating lever in an inoperative position.
Figure 16:
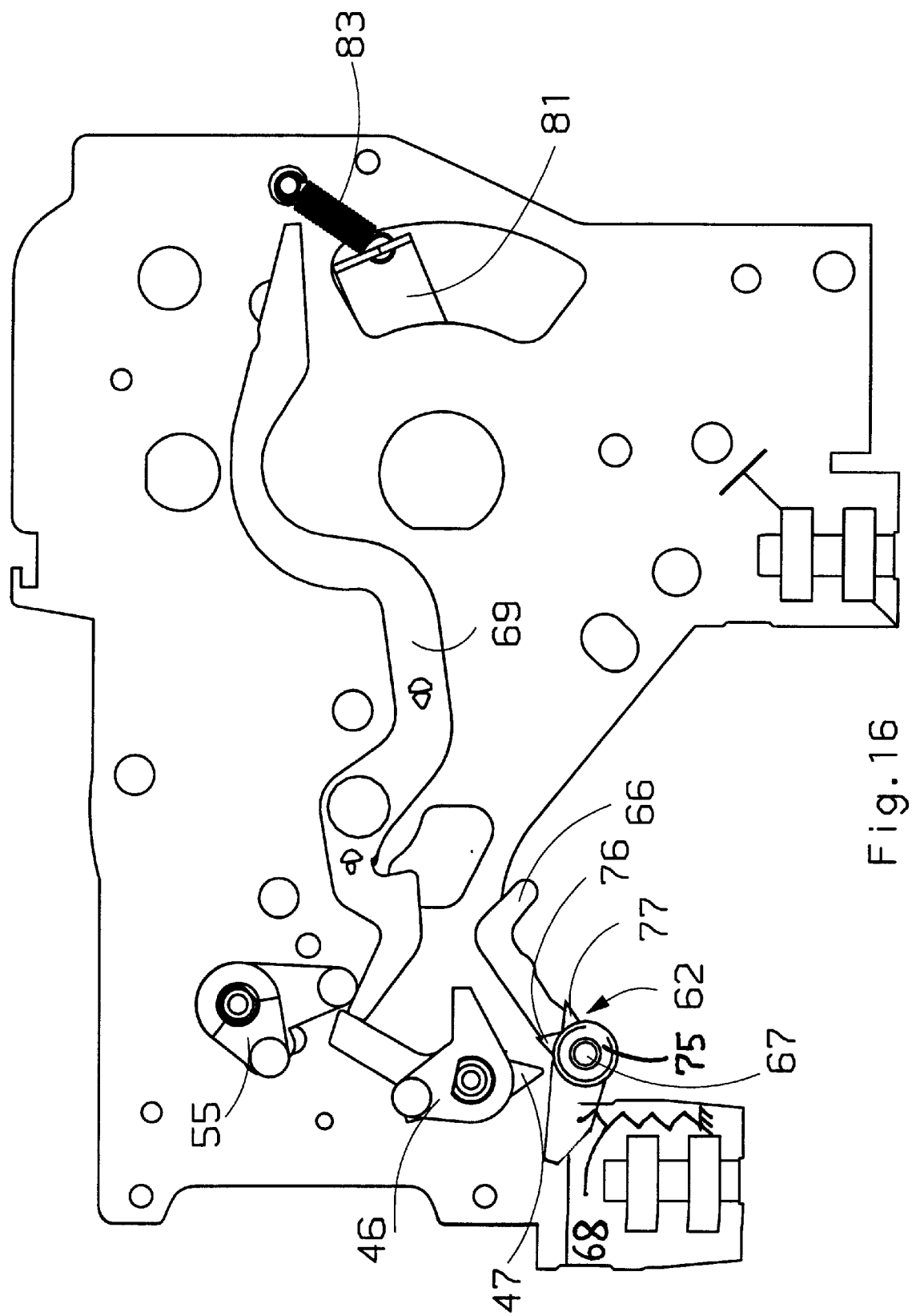
FIG. 16 is a view of a countergear lever according to a third embodiment of the invention.

The operating lever 62 according to a third embodiment of the invention has been schematically represented in FIG. 16, in a view corresponding to FIG. 8 of the first embodiment. A cam 75 is securedly united to the operating lever 62, this cam being in the form of a disk comprising two asperities 76, 77 each forming two ramps at 45°. These asperities are designed to operate in conjunction with a spigot 47 of the opening latch 46. The operating lever 62 can, by pivoting counterclockwise around its spindle, take four positions: an inoperative position, a first opening control position, a closing control position and a second opening control position. It is biased by a return spring 68 operating in traction to its second opening control position, in the counterclockwise direction in the figure.

Operation of the operating lever between the plugged-in position and the test position is identical to that of the second embodiment.

In the plugged-out position, the operating lever operates in conjunction with a cam corresponding to the cam 61 of the first embodiment which keeps it in its inoperative position. When the extraction movement begins from the plugged-out position, the operating lever encounters a ramp of the cam 61 which enables it to pivot to its first opening control position due to the biasing force of its return spring. In the course of this pivoting, the first asperity 76 of the cam operates in conjunction with the spigot 47 of the opening latch 46 and makes the latch 46 pivot to its unlatched position. At the end of this pivoting phase of the operating lever 62, the first asperity 76 is no longer in contact with the spigot 47 of the opening latch 46. The opening latch 46 is designed to reclose due to the biasing force of its own return spring. When extraction of the circuit breaker is continued, the operating lever 62 encounters a second ramp of the cam 61, which enables it to pivot to its closing control position due to the biasing force of its return spring. This pivoting causes pivoting of the intermediate lever 69, in an identical manner to the device according to the first embodiment of the invention, driving the closing latch 55 and the catch cache 81 almost simultaneously. When extraction of the circuit breaker is continued, the operating lever 62 is released and pivots due to the biasing force of its return spring. This pivoting enables the second asperity 77 of the cam 75 to operate in conjunction with the spigot 47 of the opening latch 46 in the same way as the first asperity, again causing unlatching and latching of the opening latch 46. Extraction from the plugged-out position therefore gives rise to the following sequence of controls: opening, closing and disengagement of the reloading handle, then opening. Unlike the first embodiment of the invention, the opening latch 46 is not kept open when closing takes place. It is therefore not no-load closing of the circuit breaker poles that takes place but normal closing. This arrangement has the advantage of sparing the opening and closing devices mechanically, in particular as far as the end of travel stops are concerned. It therefore increases their reliability.

When movement takes place from the extracted position to the plugged-out position, the sequence is reversed, each stage being in itself reversible.

The above description of the preferred embodiments of the invention is not exhaustive. Certain alternative versions will in fact become immediately apparent to the man of the trade. For example, it is clear that the operating lever 62 and countergear lever 70 can be replaced by any other movable element supported by the circuit breaker, for example by pull-rods movable in translation. The cam 61 which comprises a plurality of surfaces and ramps operating in conjunction with the operating lever 62 and possibly with the securing latch 71 can be replaced by a plurality of individual cams. The countergear lever 70, whose function is to give information on movement of the circuit breaker before the latter is perceptible, can also be replaced by any element able to give information relative to the movement of the kinematic transmission system, for example a cam securedly affixed to the engagement shaft 24.

Furthermore, cooperation between the cam 61 and operating lever 62 requires, in the different embodiments described, a substantial movement of the circuit breaker with respect to the frame between the plugged-out and plugged-in positions. However circuit breakers exist whose plug-in mechanism performs movement from a test position to a plugged-in position whereas the external walls of the circuit breaker remain practically immobile. It may then be advantageous to take the information relative to the plugged-out, test or plugged-in state of the circuit breaker not from the fixed part of the frame but from the kinematic engagement system itself, which is supported by the frame. The invention therefore also relates to an apparatus comprising a circuit breaker with a movable operating part with three or four positions, operating in conjunction with a link part of the kinematic engagement system, in particular with a cam or an eccentric finger securedly affixed to the output part of this kinematic system, for example a cam securedly affixed to the engagement shaft. This cooperation can take place directly or indirectly via a movable part preferably supported by the frame.

Furthermore, differentiation of the circuit breakers intended for the two markets with and without discharge on extraction, in the described embodiments, is not reversible since it implies an edge of the side flange of the circuit breaker being broken. To make this action reversible, a removable part simply has to be provided forming a stop, to be fixed by any suitable means onto the edge of the enlarged opening of the flange in order to reconstitute the initial edge.

What is claimed is:

1. A circuit breaker comprising: at least one pair of contacts at least one of which is movable and can take with respect to the other a closed position and an open position; an opening device comprising an opening spring movable from a loaded stage to a released state and from the released state to the loaded state, said opening spring being associated to the movable contact in such a way that relaxation of the opening spring drives the movable contact to an open position and that movement of the movable contact to a closed position results in loading of the opening spring, and an opening latch movable between a latched position in which the opening latch prevents movement of the movable contact from the closed position to the open position and an unlatched position enabling this movement; a loading device comprising a closing spring movable from a loaded state to a released state, the closing spring being associated with the movable contact in such a way that relaxation of the closing spring drives the movable contact the closed position, and a closing latch for latching the closing spring in the loaded state, a movable control means accessible from the outside of the circuit breaker and movable from an inoperative position in which the movable control means does not interact either with the opening latch or with the closing latch, to a first opening control position and from the first opening control position to an unloading control position, wherein the movable control means unlatches the opening latch by moving from an inoperative position to a first opening control position, and unlatches the closing latch by moving from the first opening control position to an unloading control position.

2. The circuit breaker according to claim 1, further comprising: a return spring to return the movable control means to the inoperative position, and a movable latching means movable between a latching position in which the movable latching means latches the movable control means in a position other than the inoperative position and a released position in which the movable latching means does not interact with the movable control means.

3. The circuit breaker according to claim 1, wherein the movable control means is a lever.

4. The circuit breaker according to claim 1, wherein the movable control means when moving from the first opening control position to the unloading control position, secures the opening latch in the unlatched position.

5. The circuit breaker according to claim 1, wherein the movable control means can take a second opening control position, the unloading control position being situated between the first opening control position and the second opening control position, and the movable control means, when moving to the unloading control position, does not interact with the opening latch.

6. The circuit breaker according to claim 1, wherein access to the unloading control position of the movable control means is inhibited by a blocking means.

7. The circuit breaker according to claim 6, wherein the blocking means includes a stop for coming into contact with the movable control means before the movable control means reaches the unloading control position.

8. A switchgear apparatus comprising: a circuit breaker according to claim 1 and a fixed external frame equipped with a kinematic engagement system comprising at least one primary shaft guided in rotation with respect to the frame and designed to operate in conjunction with a drive part, and an output part operable in conjunction with the circuit breaker in such a way that rotation of the primary shaft causes movement of the kinematic transmission system between a plugged-out position and a plugged-in position and corresponding movement of the circuit breaker in reversible manner from a plugged-out state to a plugged-in state, wherein the frame further comprises in addition at least one link part cooperating with the movable control means so as to move the movable control means to the first opening control position when the circuit breaker passes via a first indexed position, in the plug-out direction.

9. The switchgear apparatus according to claim 8, wherein the frame further comprises at least one link part cooperating with the movable control means so as to move the movable control means to the unloading control position when the circuit breaker passes via a second indexed position with respect to the frame, in the plug-out direction.

10. The switchgear apparatus according to claim 8, wherein the frame further comprises at least one link part cooperating with the movable control means when the circuit breaker is approximately in the plugged-in position in such a way that the movable control the inoperative position to the first opening control position when the circuit breaker leaves the plugged-in position.

11. The switchgear apparatus according to claim 9, wherein the output part of the kinematic engagement system comprises at least one engagement cam operating in conjunction with a follower element of the circuit breaker in such a way that rotation of the engagement cam in one direction causes plug-in of the circuit breaker and that rotation of the engagement cam in the opposite direction causes plug-out of the circuit breaker, wherein a zone of the engagement cam corresponding to the circuit breaker reaching the plugged-in position is shaped in such a way that a large rotation of the engagement cam corresponds to approximately no movement of the circuit breaker with respect to the frame.

* * * * *